United States Patent [19]

Tashiro et al.

[11] Patent Number: 4,958,835
[45] Date of Patent: Sep. 25, 1990

[54] GAME PLAYING SYSTEM

[75] Inventors: Koichi Tashiro; Shinichiro Okamoto, both of Kawasaki; Tatsuro Okamoto, Yokohama, all of Japan

[73] Assignee: Namco Ltd, Tokyo, Japan

[21] Appl. No.: 250,569

[22] Filed: Sep. 29, 1988

[30] Foreign Application Priority Data

Oct. 3, 1987 [JP] Japan ................... 62-250259

[51] Int. Cl.$^5$ .............................. A63F 9/22
[52] U.S. Cl. .................. 273/85 G; 273/1 E; 273/DIG. 28; 364/410
[58] Field of Search ............ 273/1 E, 85 G, DIG. 28, 273/138 A; 364/410, 411, 412

[56] References Cited

U.S. PATENT DOCUMENTS

| | | | |
|---|---|---|---|
| 4,477,069 | 10/1984 | Crudgington, Jr. | 273/DIG. 28 |
| 4,521,014 | 6/1985 | Stirick | 273/DIG. 28 |
| 4,564,923 | 1/1986 | Nakano | 273/85 G |
| 4,570,930 | 2/1986 | Matheson | 273/DIG. 28 |
| 4,572,509 | 2/1986 | Sitrick | 273/DIG. 28 |
| 4,593,904 | 6/1986 | Graves | 273/1 E |
| 4,636,951 | 1/1987 | Harlick | 273/DIG. 28 |
| 4,738,451 | 4/1988 | Logg | 273/DIG. 28 |
| 4,760,527 | 7/1988 | Sidley | 273/DIG. 28 |
| 4,805,907 | 2/1989 | Hagiwara | 273/DIG. 28 |

Primary Examiner—Edward M. Coven
Assistant Examiner—Jessica J. Harrison
Attorney, Agent, or Firm—Oliff & Berridge

[57] ABSTRACT

A game playing system for business use includes a plurality of independent game machines and transmission lines for connecting the game machines into a loop, data calculated in each of the game machines being sequentially transmitted to the other game machines through the looped transmission lines, whereby the game machines can be played in a game simultaneously within the same game space. Each of the game machines includes a count data calculating section for clearing running count data when data relating to the game machine itself are transmitted thereinto and for incrementing the running count data and transmitting the incremented data to the next game machine when data relating to the other game machines are transmitted thereinto and a date erasing section for discriminating whether or not the running count data is higher than a given reference level at each time when data are transmitted to the respective game machine and for forcedly clearing the game state data if the running count data is higher than the reference level, whereby even if there is created any abnormality in any one of the game machines defining the loop, the remaining game machines can be normally played in the game.

7 Claims, 12 Drawing Sheets

CONCURRENT GAME
POSSIBLE.
PUT COIN INTO SLOT
AND DEPRESS START
BUTTON    TIME 10

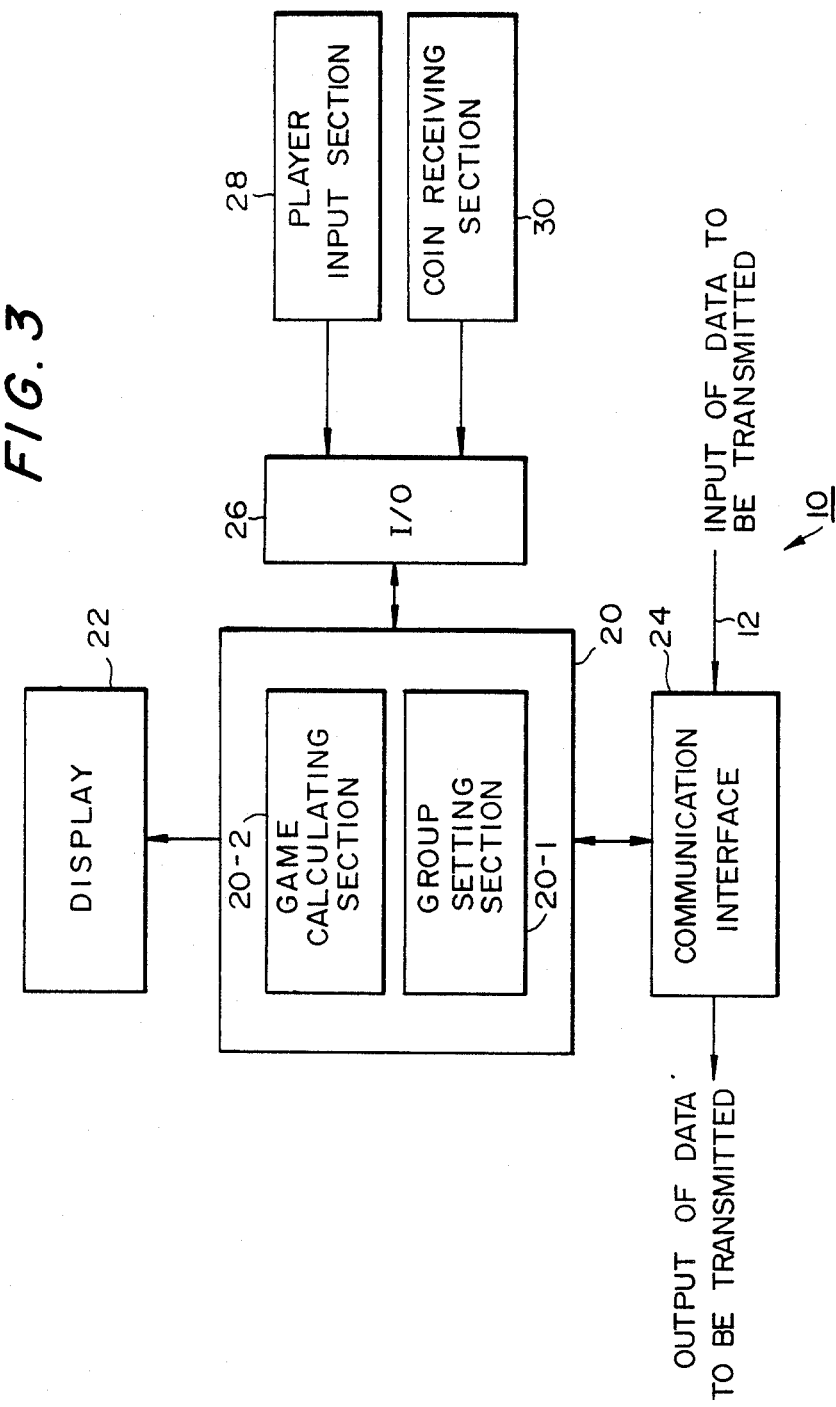

FIG. 8

| | |
|---|---|
| PLAYER | # 10-a |
| PLAYER | # 10-b |
| PLAYER | # 10-c |
| PLAYER | # 10-d |
| PLAYER | # 10-e |
| PLAYER | # 10-f |
| PLAYER | # 10-g |
| PLAYER | # 10-h |
| COMPUTER | # 1 |
| COMPUTER | # 2 |
| COMPUTER | # 3 |
| COMPUTER | # 4 |
| COMPUTER | # 5 |
| COMPUTER | # 6 |
| COMPUTER | # 7 |
| COMPUTER | # 8 |
| COMPUTER | # 9 |
| COMPUTER | # 10 |
| COMPUTER | # 11 |
| COMPUTER | # 12 |
| COMPUTER | # 13 |
| COMPUTER | # 14 |
| COMPUTER | # 15 |
| COMPUTER | # 16 |

} DATA OF CARS OPERATED BY PLAYERS (MAXIMUM OF EIGHT CARS)

} DATA OF CARS OPERATED BY COMPUTER (MAXIMUM OF SIXTEEN CARS)

FIG.9

| PLAYER #10-a |
|---|

| BASE NUMBER |
|---|
| GAME STATUS |
| GAME GROUP NUMBER |
| COMMAND |
| CAR STATUS |
| COUNTER |
| CHECK SUM |

FIG.10

| COMPUTER #1 |
|---|

| BASE NUMBER |
|---|
| CAR STATUS |
| COUNTER |
| CHECK SUM |

GAME PLAYING SYSTEM

BACKGROUND OF THE INVENTION

1. Field of the Invention:

The present invention relates to a game playing system for commercial use and particularly to such a system enabling a plurality of players to play a game simultaneously in the same game space.

2. Description of the Prior Art:

With spread of video games, various types of game machines have been developed and actually used. Almost all such game machines in the prior art are of a single-player type wherein only one player plays a game in a completely independent game space. Even where a plurality of identical game machines are installed in the same place, only one player can play a game with a computer as a companion.

To enjoy the game with further pleasure, it is desirable that a plurality of players can simultaneously play the corresponding number of game machines such as drive game machines together in the same game space to emulate each other as in driving technique.

To this end, the prior art has provided various types of multi-player game machines wherein a plurality of players can play the same game simultaneously in the same game space to increase the enjoyment of the game.

In the accompanying drawings, FIG. 12 exemplifies one of the prior art multi-player game machines, which is adapted to display a plurality of objects to be operated by the respective players in the same scene. The players can play the same game together in the same game space by manipulating control members 100A, 100B and 100C on a control panel, respectively.

As such a multi-player game machine, there is known "GUNTRET" commercially available from ARITA Company.

FIG. 13 shows another example of the prior art multi-player game machines, which comprises a plurality of independent display sections each having a control member 100A, 100B or 100C, each of the display section being adapted to display a game scene representative of the common game space.

Such a game machine includes, for example, "VS TENNIS" commercially available from NINTENDO.

In the prior art multi-player game machines, however, the number of players playable in the same game space is limited to the number of control members as shown by 100A, 100B and 100C since these control members are incorporated into one and the same game machine. In the case where the multi-player game machine has three control members as shown in FIGS. 12 and 13, therefore, only three players can play the same game simultaneously in the same game space.

Further, since the prior art multi-player game machines are constructed exclusively for multi-player games with a plurality of control members as shown by 100A, 100B and 100C and a display or displays being incorporated into only a single game machine, they are extremely expensive in comparison with other single-player game machines, resulting in limitation of the number of game machines which are to be installed for commercial use.

SUMMARY OF THE INVENTION

It is therefore an object of the present invention to provide a game playing system for commercial use which uses a plurality of game machines each playable independently as a single-player game and in which even if there is created any abnormality in any one of the game machines, the remaining game machines can normally play the multi-player game.

To this end, the present invention provides a game playing system comprising a plurality of independent game machines, each of the game machines being playable in a single-player game and also in a mulit-player game with the other game machines in the same game space by the reception and transmission of data between one player's game machine and the other game machines through data transmission lines which connect said game machines together into a loop, each of said game machines comprising a communication interface for performing the reception and transmission of data between the one player's game machine and the other game machines through said transmission lines, said data including game state data representative of the progress of the game for each of said game machines, a data identification code representative of a game machine corresponding to said game state data and a running count data incremented at each time when said game state data pass through the respective one of said game machines and game calculating means for performing the reception and transmission of data between the one player's game machine and the other game machines through the communication interface to make game calculations, said game calculating means comprising a data discriminating section for, at each time when data are transmitted to the one player's game machine, checking a data identification code included in said transmission data to discriminate whether or not said transmission data belongs to the one player's game machine, a count data calculating section for clearing running count data when data belonging to the one player's game machine are transmitted to the one player's game machine and for incrementing the running count data and transmitting the incremented running count data to the next game machine when data relating to any one of the other game machines are transmitted to the one player's game machine and a data erasing section for discriminating whether or not the running count data is higher than a given reference level at each time when data are transmitted to the one player's game machine and for forcedly clearing the game state data if the running count data is higher than the reference level, whereby even if there is created any abnormality in any one of the game machines defining said loop, the remaining game machines can be normally played in a game.

BRIEF DESCRIPTION OF THE DRAWINGS

FIG. 3 is a block diagram of the concrete arrangement of each of the game machines shown in FIG. 2.

FIG. 8 illustrates a set of transmission data received and transmitted between the game machines.

FIG. 9 illustrates transmission data relating to a car operated by a player.

FIG. 10 illustrates transmission data relating to a car operated by a computer.

DETAILED DESCRIPTION OF THE PREFERRED EMBODIMENTS

Figure 1:
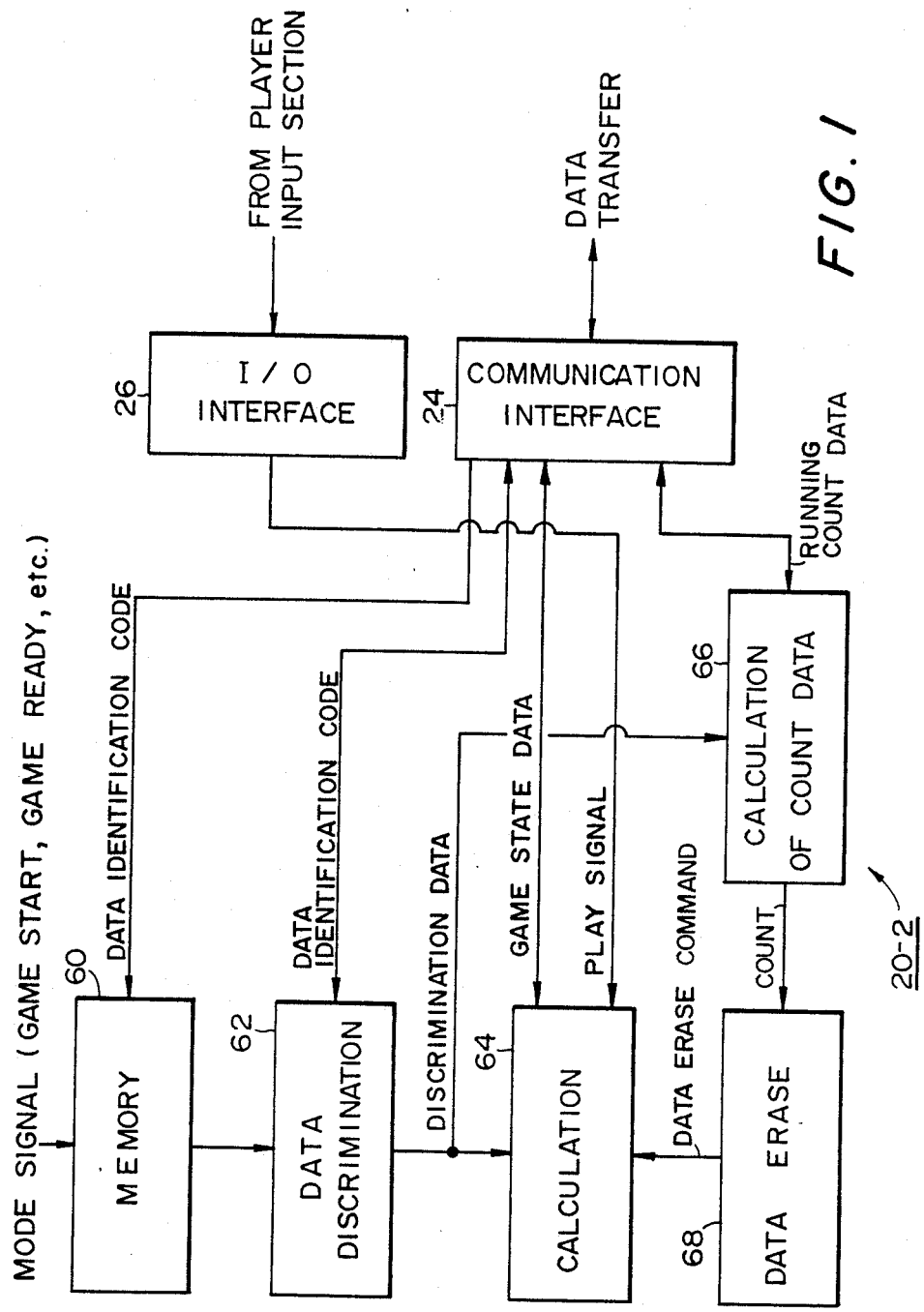
FIG. 1 is a block diagram of a game calculating section used in one embodiment of a game playing system constructed according to the present invention.

The present invention will now be described in connection with some preferred embodiments thereof illustrated in the drawings.

First Embodiment

Figures 2, 5:
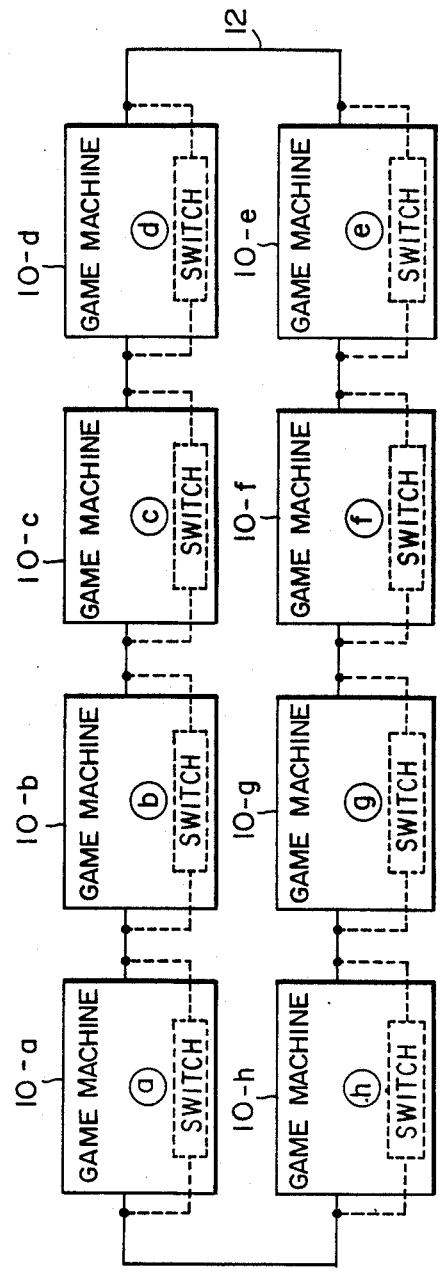
FIG. 2 exemplifies one arrangement of the present invention wherein a plurality of game machines are connected together into a loop.
FIG. 5 exemplifies a scene to be displayed in the game machines which are controlled in the game ready mode.

(a) Arrangement of the Entire System:

FIG. 2 shows the first preferred embodiment of the present invention.

In accordance with the first preferred embodiment, a game playing system for commercial use comprises a plurality of independent game machines 10-a, 10-b . . . 10-h and data transmission lines 12 connecting the game machines together into a loop. Each of the game machines is adapted to transmit data relating to that game machine to the other game machines through the transmission line 12.

The transmission data includes game state data and data identification codes and are sent through the transmission line loop 12 while passing sequentially through the game machines in the clockwise direction.

The game state data are data representative of the progress of game in each of the game machines while the data identification code is used to specify a game machine 10 corresponding to the game state data.

One of the features of the present invention is that each of the game machines 10-a, 10-b . . . 10-h can be played independently in the single-player game mode and at the same time can be played with the other game machines simultaneously within the same game space in the multi-player game mode.

(b) Game Machine

FIG. 3 shows the concrete arrangement of a game machine 10 usable in the first embodiment of the present invention.

The game machine 10 generally comprises a calculation and control section 20, a display 22, a communication interface 24, an input/output (I/O) interface 26, a player input section 28 and a coin receiving section 30.

The communication interface 24 is adapted to perform the reception and transmission of data between a one player's game machine and the other game machines through the transmission lines 12.

The calculation and control section 20 is adapted to perform various types of calculations in accordance with input signals from the player input section 28, coin receiving section 30 and I/O interface 26 and game data received and transmitted between the one player's game machine and the other game machines through the communication interface 24 of the one player's game machine, with the results being imaged on the display 22.

To make a multi-player game by the use of the independent game machines 10, it is required that a group is formed from the game machines 10 to participate in the multi-player game prior to the start of game.

(c) Group Setting Section:

To this end, the calculating and processing section 20 comprises a group setting section 20-1 and a game calculating section 20-2 for performing game calculations after the setting of a group.

Figure 4:
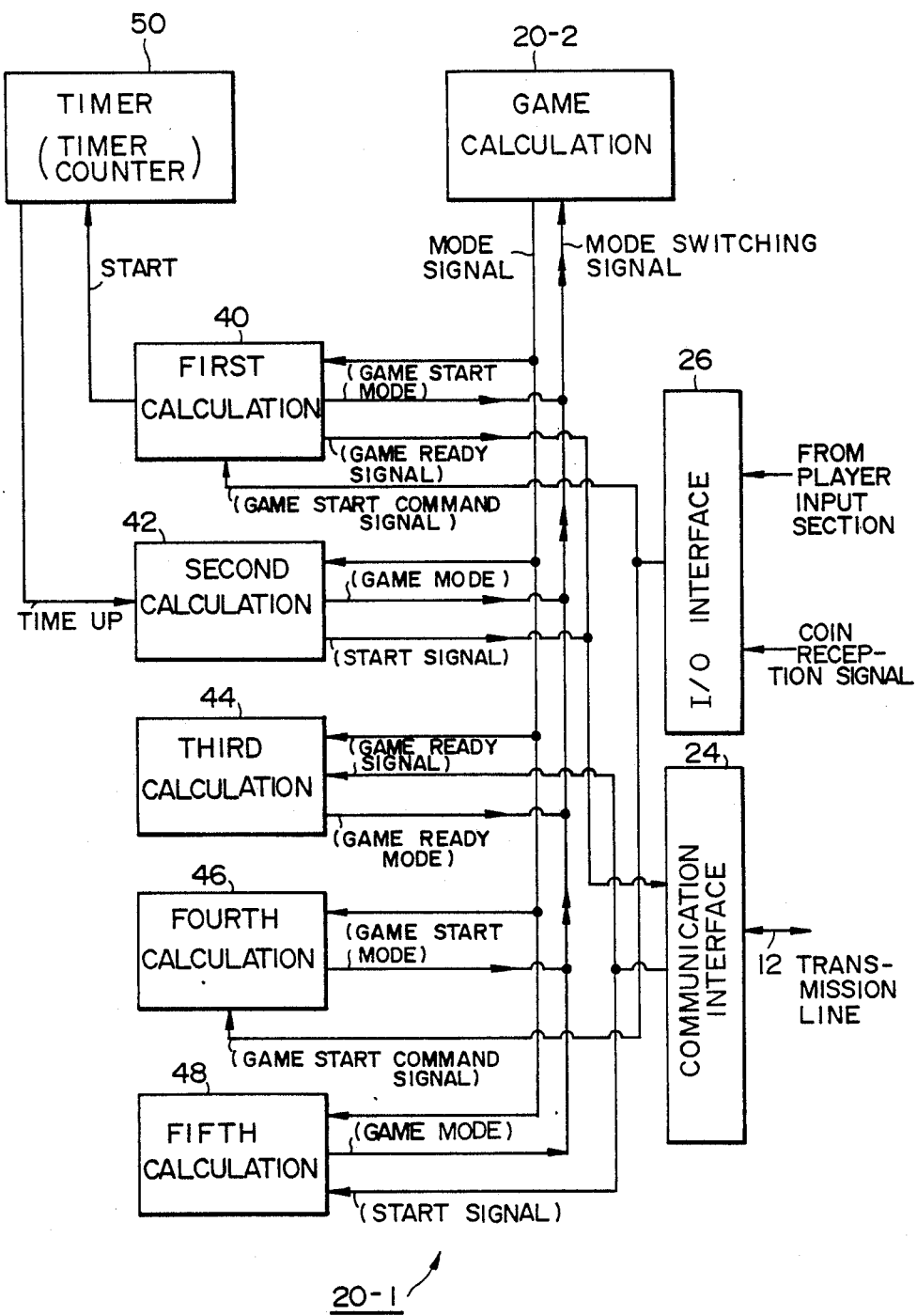
FIG. 4 is a block diagram of the concrete arrangement of the group setting section shown in FIG.3.

FIG. 4 shows a concrete arrangement of such a group setting section 20-1 which comprises a first calculation means 40, a second calculation means 42, a third calculation means 44, a fourth calculation means 46, a fifth calculation means 48 and a timer 50.

The timer 50 includes a timer/counter which is adapted to time up after it has counted ten counts at each given time.

Figure 6:
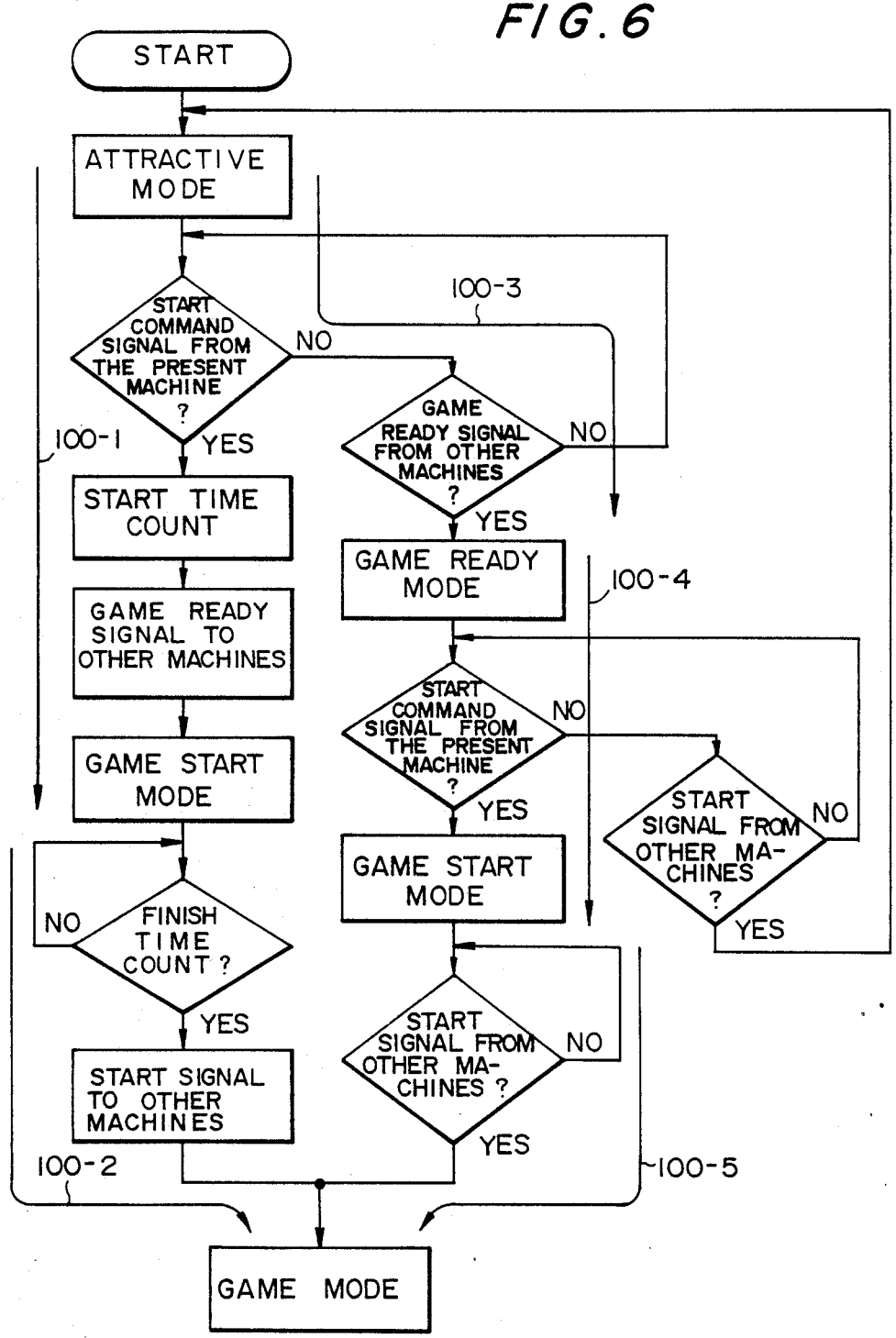
FIG. 6 is a flow chart illustrating the operation of the circuit shown in FIG. 4.

The first calculation means 40 is adapted to execute a program shown by a flow line 100-1 in FIG. 6.

More particularly, if a game start command signal is inputted into one player's game machine through its player input section 28 when the game calculation section 20-1 thereof is in the attractive mode, the timer 50 of this game machine is first started. At the same time, the first calculation means 40 switches the calculation mode in the game calculating section 20-2 from the attractive mode to the game start mode and also transmits a game ready signal to the other game machines 10 through the communication interface 24 and the transmission lines 12.

The second calculation means 42 is adapted to execute a program shown by a flow line 100-2 in FIG. 6.

The second calculation means 42 switches the calculation mode in the game calculating section 20-2 from the game start mode to the game mode if the timer 50 is timed up when the game calculating section 20-2 is in its game start mode. At the same time, the second calculation means 42 transmits a game start signal to the other game machines 10 through the communication interface 24 and the transmission lines 12.

The third calculation means 44 is adapted to execute a program shown by a flow line 100-3 in FIG. 6.

The third calculation means 44 switches the calculation mode in the game calculating section 20-2 from the attractive mode to the game ready mode if the one player's game machine receives a game ready signal from any one of the other game machines 10 when the game calculating section 20-2 is set at its attractive mode.

The fourth calculation means 44 is adapted to execute a program shown by a flow line 100-4 in FIG. 6.

The fourth calculation means 46 switches the calculation mode in the game calculating section 20-2 from the game ready mode to the game start mode if the one player's game machine receives a game start signal from the player input section 28 when the game calculating section 20-2 is in the game ready mode.

The fifth calculation means 48 is adapted to execute a program shown by a flow line 100-5 in FIG. 6.

The fifth calculation means 48 switches the calculation mode in the game calculating section 20-2 from the game start mode to the game mode if the one player's game machine receives a game start signal from any one of the other game machines 10 when the game calculating section 20-2 is set at its game start mode.

(d) Game Calculating Section:

FIG. 1 also shows a concrete arrangement of a circuit which may be used in the aforementioned game calculating section 20-2.

The game calculating section 20-2 comprises a memory 60, a data discriminating section 62, a calculating and processing section 64, a count data calculating section 66 and a data erasing section 68.

The memory 60 is adapted to store data identification codes for all the game machines in the group to which the one player's game machine belongs, transmitted from the game machines through the transmission lines 12, prior to the start of game. Such data identification codes may be in the form of any suitable codes such as base numbers which have already been provided to each of game machines on shipping or random numbers which are generated by random-number generators contained in game machines.

At each reception of transmission data after the start of game, the data discriminating section 62 is adapted to compare a data identification code included in the transmission data with the data identification codes stored in the memory 60 to discriminate whether or not this transmission data is data relating to the group to which the one player's game machine belongs, with the discriminated result being then supplied to the calculating and processing section 64.

If the transmission data relates to the above group, the calculating and processing section 64 executes a calculating and processing operation of the game in accordance with the game state data and transmits the same transmission data to the other game machines through the communication interface 24 and the transmission lines 12.

At this time, if the transmission data relates to the one player's game machine itself, the calculating and processing section 64 processes the game state data in accordance with the result from the above calculation to form new game state data which in turn is supplied to the other game machines.

If the transmission data relates to the group to which the one player's game machine belongs, but not to the one player's game machine, the calculating and processing section 64 processes the game state data depending on the contents of game or transmits the transmission data to the other game machines without execution of the aforementioned calculating and processing operation.

In such a manner, each of the game machines used in the first preferred embodiment of the present invention can perform the reception and transmission of the transmission data including the game state data representative of the progress of the game in each game machine and the data identification code representative of each game machine corresponding to the respective game state data between such a game machine and the other game machines. Thus, all the game machines belonging to the same group can be played in the multi-player game mode under the same condition.

In accordance with the first embodiment, particularly, even though a plurality of groups are formed, for example, by the use of eight game machines 10-*a*, 10-*b* . . . 10-*h* as shown in FIG. 2, each group can play a multi-player game in the common game space. This can highly increase the efficiency of utilization in the entire system.

The count data calculating section 66 is adapted to clear the running count data when the corresponding game machine receives its own transmission data and to increment the running count data by one at each time when the transmission data relating to one of the other game machines are transmitted to said corresponding game machine. The transmission data are then sent to the next adjacent game machine 10 through the communication interface 24.

The data erasing section 68 is adapted to judge whether or not the transmission data received by the corresponding game machine are higher than a given reference level. If the transmission data are higher than the reference level, the data erasing section 68 focedly clears the game state data relating thereto. Thus, even if there is created any abnormality in any one of the game machines 10-*a*, 10-*b* . . . 10-*h* defining the loop, the remaining game machines can normally play the game.

Concrete Example

There will now be described a concrete example in which the game playing system of the present invention is applied to a driving game.

Figure 7:
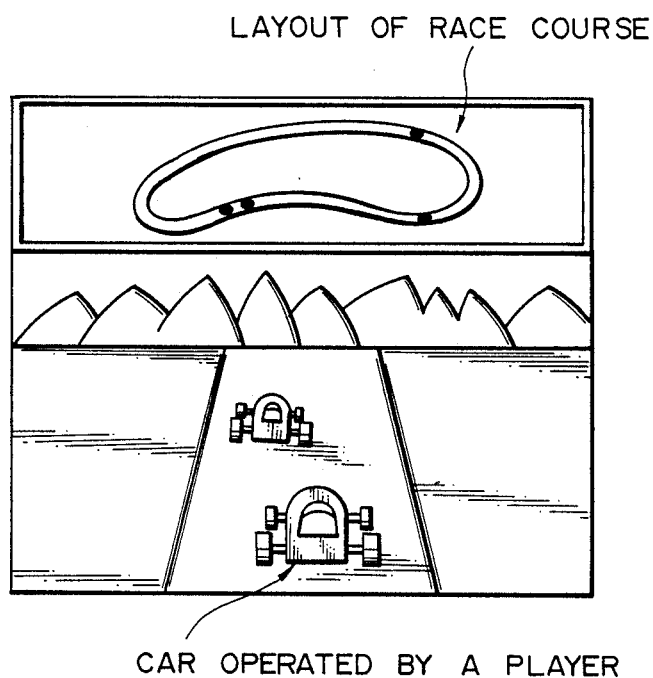
FIG. 7 exemplifies a game scene to be displayed in the respective one of driving game machines to which the present invention is applied.

The game playing system is adapted to play a car race by a maximum number of eight players and comprises eight game machines 10 each of which has a display 22 imaging one player's car as well as the other seven cars, as shown in FIG. 7.

The player input section 28 of each of the game machines 10 includes a start button, a steering wheel, a shift lever, an accelerating pedal, a braking pedal and so on. In addition to the eight racing cars to be controlled by the players through the respective game machines 10, the game space for the game machines includes sixteen (16) cars to be controlled by a computer.

The driving game is set to extend a play time in each of the game machines belonging to the same group as a car controlled by a player through a game machine in the same group reaches the goal within its own play time.

After repetition of such an extension of play time, the driving game is terminated as all of the remaining cars reaches the goal after they have rounded on the racing course by given times or if none of the cars can round on the racing course by given times within the initiately set play time.

In the game playing system shown in FIG. 2, it is assumed that a set of transmission data shown in FIG. 8 are transmitted clockwise passing through the game machines along the transmission lines 12.

Since a scene in the normal video game is updated at each 1/60 seconds, the transmission speed is preferably set at a level corresponding to one round of the transmission data through the transmission line loop 12 in synchronism with the above updating time period.

The set of transmission data shown in FIG. 8 includes transmission data relating to the eight cars which are to be controlled by the players and to the sixteen cars which are to be controlled by the computer.

FIG. 9 shows the details of the transmission data relating to the cars controlled by the players, which data includes a base number, game status, game group number, command, car status, counter and check-sum.

Each of the base numbers is representative of a game machine 10 and provided by an output signal from a random-number generating section after power-on.

Data relating to a game machine 10 having a base number can be distinguished from those of the other game machines. When the data is being transmitted along the transmission line loop, each of the game machines 10 may rewrite the contents of the transmission data if that game machine receives the transmission data corresponding to its own base number to take them as data relating to the game machine. Naturally, this base number is stored in the game machine 10.

The game status is representative of what state a game machine 10 is presently under and provided, for example, by data relating to the attractive mode, game ready mode, game mode, game over mode and so on.

The game group number is representative of the base numbers of all the game machines belonging to a group which has initiated to play a game simultaneously. The game group number data are provided on setting of the group.

The command data are in the form of various command data used to play one of the game machines in synchronism with the remaining game machines in the same group. The command data include, for example, a command for causing all the racing cars to start simultaneously or another command for causing the play time of the racing cars to be extended as a car in the same group is extended in play time.

Figure 11B:
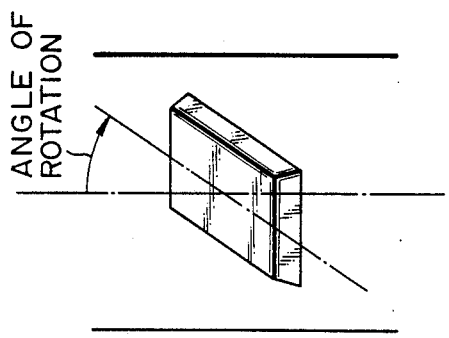
FIG. 11 illustrates data used to specify the postion of a running car.
Figure 11A:
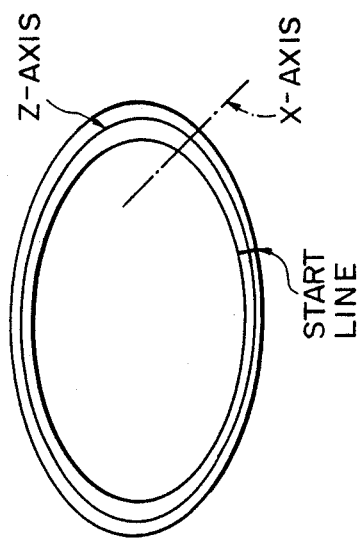
Figure 12:
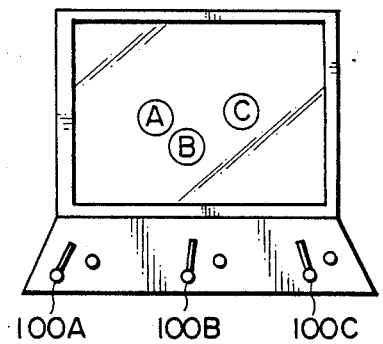
FIGS. 12 and 13 illustrate multi-player game machines in the prior art.
Figure 13:
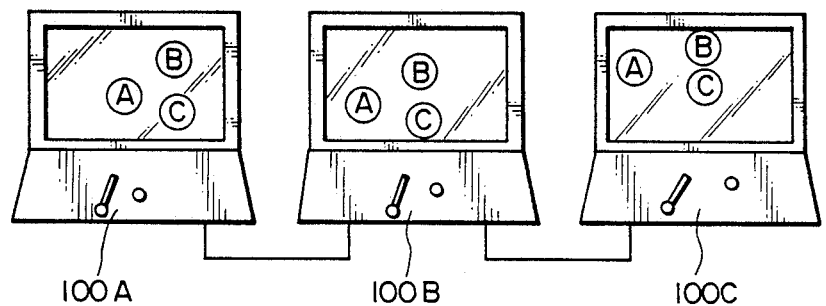

The car status is representative of data relating to the state of each of the cars, for example, such as the position of that running car. As shown in FIG. 11(a), for example, the position of the running car along the racing course is represented on the Z-axis while the position of the running car in a direction perpendicular to the racing course is shown along the X-axis. As shown in FIG. 11(b), further, the orientation of the car relative to the racing course is represented by an angle of rotation.

If there is created an abnormality in any one of the game machines 10-a, 10-b ... 10-h defining the loop, the car status information included in the transmission data for the one game machine will not be updated at all. This abnormality must rapidly be eliminated since the car controlled by the one game machine 10 having the abnormality is stopped at a location within the game space, providing an obstruction for the other normally running cars.

For such a purpose, the transmission data includes the aforementioned counter which is running count data counted up on each passage of data through one of the game machines and cleared by the count data calculating section 66 on passage of the transmission data through the one game machine.

In the system of FIG. 2, therefore, the count becomes a maximum value of eight which will not be exceeded under the normal operation of all the game machines 10.

If there is created any fault, for example, in a game machine 10-a during play of a game, the count may exceed eight since the count value included in the transmission data relating to that game machine 10-a will not be reset. It is, therefore, possible to detect any abnormal game machine by checking the aforementioned count value.

The check-sum is representative of the sum of data from the base numbers of the respective transmission data to the counter and can be used to check whether or not there is created any error in the respective one of the transmission data due to affection of noise and the like on communication.

FIG. 10 shows a set of transmission data relating to a car controlled by the computer, including its base number, car status, counter and check-sum.

The data relating to the sixteen cars controlled by the computer, among the set of transmission data shown in FIG. 8, are calculated based on a top car among the cars controlled by the players.

If this top car is replaced by another car, the game machine 10 used to calculate the data relating to the sixteen cars controlled by the computer will also be changed by another game machine.

To this end, the transmission data relating to the cars controlled by the computer also include the base number and the counter as in those relating to the cars controlled by the players, as shown in FIG. 10.

Function

As all the game machines 10-a, 10-b ... 10-h shown in FIG. 2 are turned on, each game machine begins to execute its own test program and then informs the other game machines whether or not it is operable through the transmission lines 12. If any game machine 10 is not turned on or has a fault, its input and output are automatically by-passed with each other by means of a switch. Thus, the entire system will be operable even if there is any inoperative game machine. Such a checking will be periodically performed after turned on.

It is assumed herein that all the game machines 10-a, 10-b, 10-c ... 10-h are operative.

It is also assumed that after all the game machines have been energized, three game machines 10-a, 10-b and 10-c are to be played by three players. At this time, each of the game machines 10-a, 10-b and 10-c is in the attractive mode with its display 22 imaging a game scene calculated by the computer as an attractive scene.

As the game machine 10-a receives a coin from a player to receive a start command signal through the player input section 28, this game machine 10-a is switched from the attractive mode to the game start mode and at the same time the timer 50 in the game machine 10-a begins to count. The game start mode is representative of a stand-by state before the start of game.

Simultaneously, the game machine 10-a transmits a game ready signal to the other game machines through the transmission lines 12.

Thus, all the remaining game machines 10-b, 10-c ... 10-h are switched from the attractive mode to the game ready mode with each of the displays 22 thereof imaging, as a game ready scene, a confirmation message indicative of whether or not the corresponding game machine can play the multi-player game together with the game machine 10-a, as shown in FIG. 5.

While the game ready scene is being displayed, the other two players must put coins into the respective game machines (for example, 10-b and 10-h) to provide start command signals through the respective player input sections 28. If so done, each of the game machines 10-b and 10-h is switched from the game ready mode to the game start mode so that they will be capable of being played in the same game space as the game machine 10-a.

As the timer 50 of the game machine 10-a is counted down to zero after all the three game machines 10-a, 10-b and 10-h have been set at the game start mode, the game machine 10-a transmits a game start signal to the other game machines 10-b and 10-h. In such a manner, the game machines 10-a, 10-b and 10-h will be started simultaneously.

The transmission data relating to the game machines 10-a, 10-b and 10-h among the set of transmission data shown in FIG. 8 are provided, at their game group number areas, with base numbers in the same group.

While the transmission data are being transmitted through the transmission lines, therefore, the base numbers of the game machines belonging to the same group are provided to the game machines 10-a, 10-b and 10-h as data identification codes.

In accordance with the present embodiment, thus, the three game machines 10-a, 10-b and 10-h can be played in the multi-player mode under the same condition within the same game space.

After started, the three game machines 10-a, 10-b and 10-h take in the data of FIG. 8 on each reception in synchronism with the updating cycle of the video game scene. Each of the game machines performs a calculation of the game and displays game scenes on its display 22 in accordance with game state data included in the transmission data for the group to which the game machine belongs (in the present embodiment, car status data shown in FIG. 9).

If it is assumed that the cars controlled by the game machines 10-b and 10-h runs immediately ahead of the car controlled by the game machine 10-a, therefore, all these cars are imaged on the display of the game machine 10-a.

As a result, the three players can more enjoy the game by emulating each other in driving technique while viewing the cars imaged on the displays 22 of the game machines 10-a, 10-b and 10-h.

If there is created an abnormality in any one of the game machines 10-a, 10-b ... 10-h defining the loop, the car status information included in the transmission data for the one game machine will not be updated at all. This abnormality must rapidly be eliminated since the car controlled by the one game machine 10 having the abnormality is stopped at a location within the game space, providing an obstruction for the other normally running cars.

In accordance with the present invention, such an elimination of the car controlled by the abnormal game machine 10 is accomplished by the use of the count data calculating section 66 and the data erasing section 68.

The count data calculating section 66 is adapted to perform said calculating and processing operation to the set of transmission data shown in FIG. 8 on reception of them.

If it is assumed that the set of transmission data as shown in FIG. 8 have passed, for example, through a game machine 10-a, the count data calculating section 66 in the game machine 10-a clears the count for the transmission data relating to this game machine and at the same time increments the count for the transmission data relating to the cars controlled by the other game machines and computer by one.

Thus, the count included in the transmission data shown in FIG. 8 will not exceed eight when all the game machines 10 are in their normal operation.

If any one of the game machine, for example, game machine 10-h fails during playing of a game, however, the count value may exceed eight since the count of the data corresponding to the game machine 10-h will not be reset.

To avoid such a problem, the data erasing section 68 is adapted to judge whether or not the running count data is higher than a given reference level at each time when the transmission data are transmitted to the corresponding game machine. If the running count data are higher than the reference level, the game state data included in the transmission data is forcedly cleared by the data erasing section 68.

Thus, even if there is created any fault in any one of the game machines 10 during playing of the game, the car controlled by that failed game machine 10 will not be imaged on the displays of the other game machines as an obstruction since the game state data included in the transmission data relating to the failed game machine can be positively cleared by the data erasing section 68.

The reference value used in the data erasing section 68 to forcedly clear the game state data is preferably a value corresponding to the number of game machines 10 interconnected to form a loop as shown in FIG. 2. However, any suitable reference value having a sufficient margin may be preset in game machines 10 on shipping.

In the present embodiment, a plurality of independent game machines 10 are interconnected together simply through the transmission lines 12. Therefore, the number of game machines may be increased or decreased in consideration of the size and other factors of a place in which the game machines are to be installed.

Although the first embodiment of the present invention has been described as to the formation of game machines into any number of groups each of which can be played in the multi-player game under the same condition, the present invention is not limited to this arrangement and may be applied to play a multi-player game through a predetermined group of game machines under the same condition.

Although the first embodiment has been described as to the multi-player driving game, the present invention is not limited to such a game and may be applied to various other types of games such as sport games for causing a plurality of players to cooperate or emulate one another, role playing games for causing a plurality of players to play a chasing game, a hide-and-go game or a shooting game and so on.

SECOND EMBODIMENT

The second preferred embodiment of the present invention will be described below.

The second embodiment is distinguished from the first embodiment in that the second embodiment utilizes a different circuit used as a group setting section 20-1 in each game machine 10.

Figure 14:
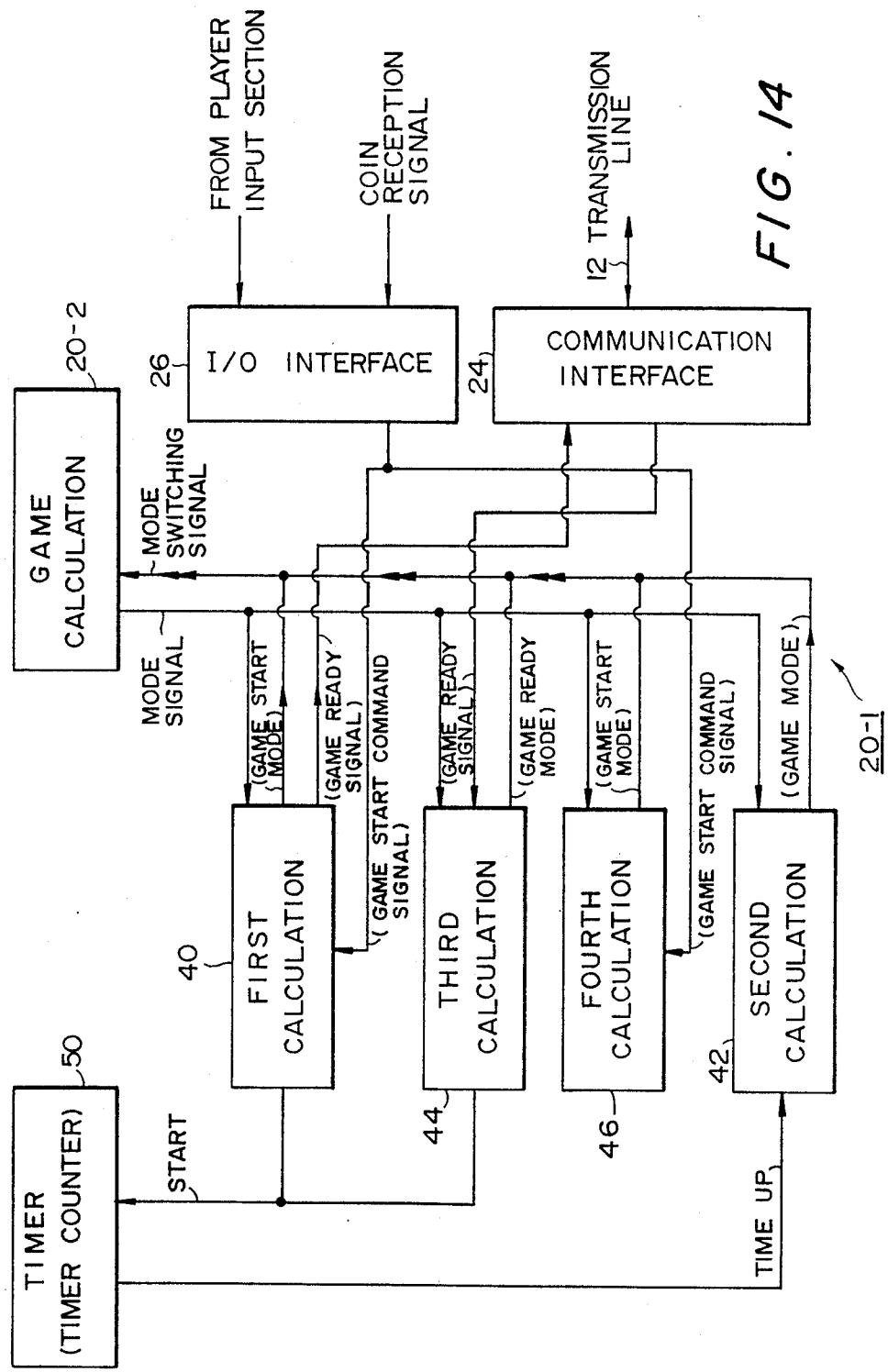
FIG. 14 is a block diagram of another form of the group setting section used in the present invention.
Figure 15:
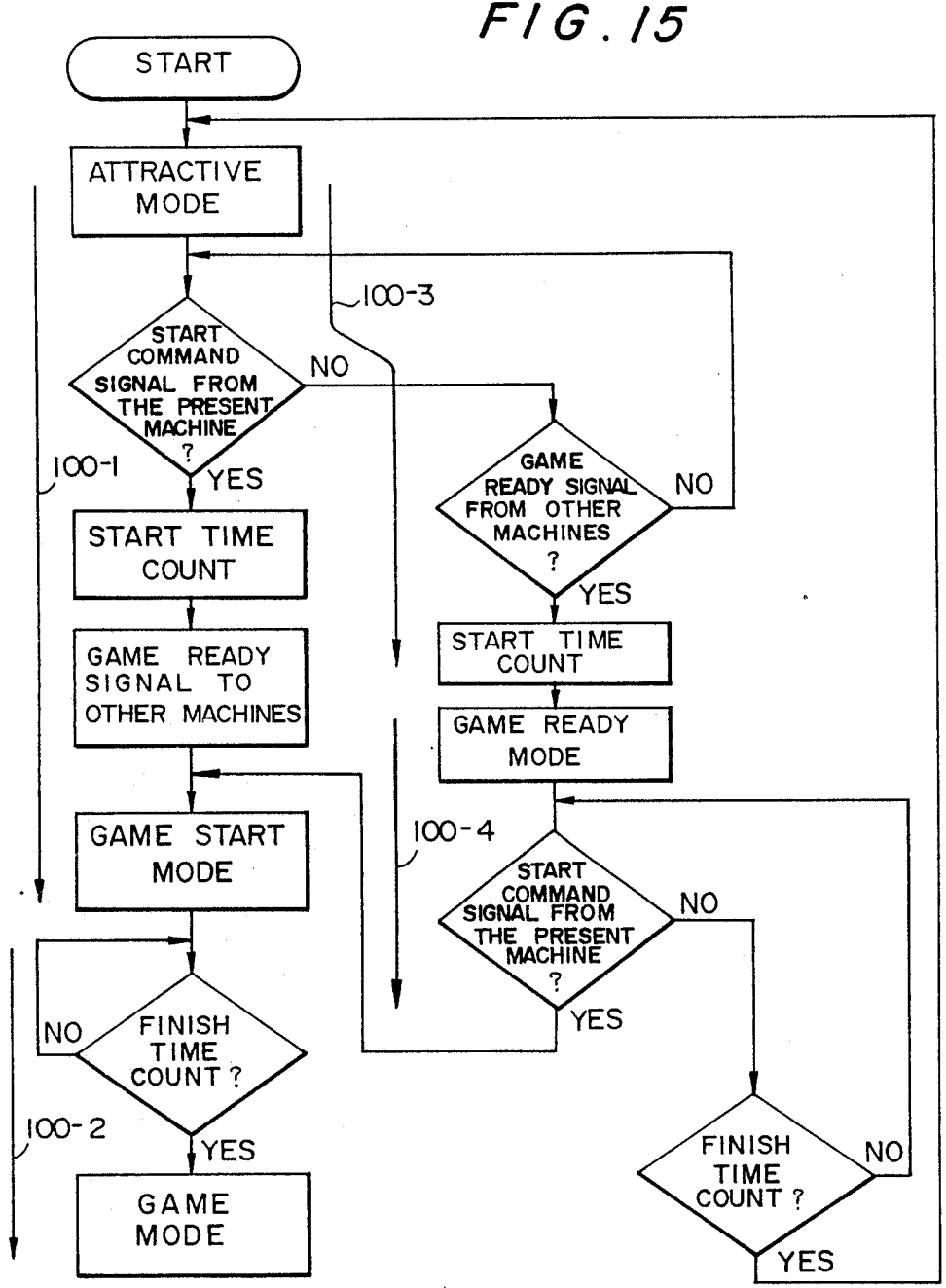
FIG. 15 is a flow chart illustrating the operation of the group setting section shown in FIG. 14.

FIG. 14 shows such a different group setting section 20-1 while FIG. 15 shows a flow chart illustrating the operation of this group setting section.

The group setting section 20-1 is characterized in that the second and third calculating sections 42 and 44 thereof are formed to execute programs shown by flow lines 100-2 and 100-3 in FIG. 15.

More particularly, the second calculating section 42 is adapted to switch the calculation mode of the game calculating section 20-2 from the game start mode to the game mode if the timer 50 is timed up when the game calculating section 20-2 is in its game start mode.

The third calculating section 44 is adapted to start the timer 50 and to switch the corresponding game machine from the attractive mode to the game ready mode if a game ready signal is inputted into said game machine from the other game machines when the game machine is in the attractive mode.

In such a manner, the second embodiment is not required to have the fifth calculation means 48 which would otherwise be required in the first embodiment. Nevertheless, the game playing system of the present invention can set any number of game machine groups each of which can play simultaneously in a multi-player game within the same game space.

Although the previous embodiments have been described as to the increment of the running count data in the plus direction, the present invention is not limited to this arrangement and may be applied to increment the count data in the minus direction. If the running count data exceeds a given reference level in the minus direction, that is, are numerically smaller than the given reference level, the game state data will be erased.

As will be apparent from the foregoing, the present invention can provide a game playing system which utilizes a plurality of independent single-player game machines to play a multi-player game within the same game space, each of the game machines comprising a data discriminating section, a count data calculating section and a data erasing section, whereby even if there is created an abnormality in any one of the game machines defining a loop, the players can normally enjoy the multi-player game through the remaining game machines.

We claim:

1. A game playing system comprising a plurality of independent game machines, each of said game machines being playable in a single-player game and a multi-player game with the other game machines simultaneously in the same game space by the reception and transmission of data between one player's game machine and the other game machines through data transmission lines which connect said game machines together into a loop, each of said game machines comprising:

communication interface means for performing the reception and transmission of data between the one player's game machine and the other game machines through said data transmission lines, said data including game state data representative of the progress of the game for each of said game machines, data identification codes representative of each game machine corresponding to said game state data, and running count data incremented at each time when said game state data passes through a respective one of said game machines; and game calculating means for performing the reception and transmission of data between the one player's game machine and the other game machines through the communication interface means to make a calculation of the game in a common game space, said game calculating means comprising:

a data discriminating section means for checking, at each time when data are transmitted to the one player's game machine, a data identification code included in said transmitted data to discriminate whether or not said transmitted data belongs to the one player's game machine;

a count data calculating section means for clearing running count data and transmitting the cleared running count data to a next game machine when data belonging to the one player's game machine are transmitted to the one player's game machine, and for incrementing the running count data and transmitting the incremented running count data to the next game machine when data relating to any one of the other game machines are transmitted to the one player's game machine; and a data erasing section means for discriminating whether or not the running count data is higher than a given reference level each time data are transmitted to the one player's game machine, and for forcedly clearing the game state data if the running count data is higher than the reference level, whereby even if there is created any abnormality in any one of the game machines defining said loop, the remaining game machines can be normally played in the game.

2. A game playing system as defined in claim 1, wherein each of said game machines comprises group setting means for grouping said game machines, including the one players game machine to play a game simultaneously together with the other game machines grouped into a predetermined group in the same game space.

3. A game playing system as defined in claim 1, wherein each of said game machines includes input and output sections for the transmitted data, and bypass means for automatically by-passing the input and output sections of any game machine in a fault or power-off condition.

4. A game playing system as defined in claim 1, wherein said game calculating means comprises a memory means for storing, prior to the start of the game, data identification codes for all of the game machines belonging to a group to which the one player's game machine belongs;

a data discriminating means for comparing, at each time data are transmitted to the one player's game machine, a data identification code included in said data with a corresponding code stored in said memory to discriminate whether or not said transmitted data are data of the group to which the one player's game machine belongs; and calculating and processing means for performing a calculation of the game in accordance with the game state data when the transmitted data belongs to the group to which the one player's game belongs, whereby the reception and transmission of transmitted data between the game machines within the group occurs through the data transmission lines, said transmitted data including game state data representative of the progress of the game and data identification codes representative of game machines corresponding to each of the game state data, thereby enabling players to group the game machines into any group and to play a game simultaneously within the same game space through the grouped game machines.

5. A game playing system as defined in claim 1, wherein each of said game machines comprises player input means for inputting, by a player, of a game start command signal into the one player's game machine, group setting means for grouping said game machines, including the one player's game machine, to participate in a game within the same game space in accordance with the game start command signal from said player input means and at least one signal received from the other game machines through the communications interface means, whereby the grouped game machines can be played in the game simultaneously within the same game space.

6. A game playing system as defined in claim 5, wherein said group setting means comprises:
  game starting timer means;
  a first calculation means for driving said timer means and switching its own calculation mode from an attractive mode to a game start mode, and for transmitting, at the same time, a game ready signal to the other game machines when a game start command signal is inputted into the one player's game machine in the attractive mode;
  a second calculation means for switching its own calculation mode from the game start mode to a game mode and for transmitting, at the same time, a game start signal to the other game machines when said timer means is timed up in the game start mode;
  a third calculation means for switching its own calculation mode from the attractive mode to a game ready mode when a game ready signal is inputted into the one player's game machine from any one of the other game machines in the attractive mode;
  a fourth calculation means for switching its own calculation mode from the game ready mode to the game start mode when the game start command signal is inputted into the one player's game machine from said player input means in the game ready mode; and
  a fifth calculation means for switching its own calculation mode from the game start mode to the game mode when a game start signal is inputted into the one player's game machine from any one of the other game machines in the game start mode, whereby said plurality of independent game machines interconnected with one another through the transmission lines can be started simultaneously within the same game space.

7. A game playing system as defined in claim 5, wherein said grouping means comprises:
  game starting timer means;
  a first calculation means for driving said timer means and switching its own calculation mode from an attractive mode to a game start mode and for transmitting, at the same time, a game ready signal to the other game machines when a game start command signal is inputted into the one player's game machine in the attractive mode;
  a second calculation means for switching its own calculation mode from the game start mode to a game mode when said timer means is timed up in the game start mode;
  a third calculation means for driving said timer means and switching its own calculation mode from the attractive mode to a game ready mode when a game ready signal is inputted into the one palyer's game machine from any one of the other game machines in the attractive mode; and
  a fourth calculation means for switching its own calculation mode from the game ready mode to the game start mode when the game start command signal is inputted into the one player's game machine from said player input means in the game ready mode, whereby said plurality of independent game machines interconnected with one another through the transmission lines can be started simultaneously within the same game space.

* * * * *